UNITED STATES PATENT OFFICE.

ROBERT BASS, OF KGL. WEINBERGE, NEAR PRAGUE, AUSTRIA-HUNGARY.

PROCESS OF PRODUCING SOLUBLE ALBUMEN POWDER.

1,066,364.  Specification of Letters Patent.  Patented July 1, 1913.

No Drawing.    Application filed November 12, 1912.   Serial No. 730,974.

*To all whom it may concern:*

Be it known that I, ROBERT BASS, subject of the Emperor of Austria-Hungary, residing at Kgl. Weinberge, near Prague, in the Empire of Austria-Hungary, have invented certain new and useful Improvements in Processes of Producing Soluble Albumen Powder.

Processes are already known for making soluble albumen powder from the flesh of sea fish or animals, such powder being intended to be employed for human consumption. Serious disadvantages are, however, connected with the ordinary processes. The albumen powders thereby produced have either a very bad taste, in consequence of their chemical treatment, or their constitution is so changed by the use of oxidizing substances, which attack them, for the purpose of removing the taste that they produce nausea and diarrhea, or they are rendered impure by salts and chemicals which remain in them and are deleterious to health, or they have the property of absorbing moisture from the air, whereby they lose their keeping properties. The ordinary methods of working are further as a rule very expensive, as the yield from the raw material is either very small or it is necessary to use expensive re-agents, such as organic extractives. The treatment of salt water fish especially for the removal of the fishy odor also causes difficulties.

Now this invention consists of a method of producing an inodorous and tasteless albumen powder soluble in water from the flesh of fish or animals, which method is substantially characterized by a treatment with calcium hydroxid being employed in succession to hydrolysis by means of ammonia, which method obviates the disadvantages hereinbefore mentioned. The albumen powder thereby produced which is soluble in water is quite inodorous and tasteless and when used as food can fully meet the requirements of the body as regards albumen.

The absence of bad flavor in the product produced by this process is not brought about by oxidizing substances being employed (such as permanganate or hydrogen superoxid), which can only be again removed with difficulty, and which also deleteriously change the albumens and convert them into poisonous substances, but by the use of calcium hydroxid following the hydrolysis by means of ammonia. The calcium hydroxid under these conditions removes all ill-smelling substances and yet on the other hand may again be easily entirely removed, and the ammonia and ammonium carbonate is entirely volatilized on evaporating and inspissating the solution. From the nature of the process it results that it can be carried out very cheaply.

For breaking up or dissolving albumens, superheated steam has hitherto been most frequently employed. The albumen solutions and albumen powder produced in this way have, however, an extremely disagreeable bitter flavor which is known as the so-called peptone taste. Attempts have been made to remove this bad taste by the use of oxidizing substances (such as hydrogen superoxid, sodium permanganate, lime and permanganate). In consequence of the intensity of the bitter flavor, however, the intended object is only incompletely attained by these means. Apart from this by such means the substances which cause the bad taste are not removed but only thoroughly chemically changed and this action also extends to the albumens which undergo a thorough chemical change in their constitution and thereby lose to a large extent their capability of serving as food products. These oxidizing substances can also only be again removed from the solution with difficulty. The bad flavor also arises in similar manner if alkalis (such as calcium hydroxid, potash lye, soda lye, ammonia) be employed for breaking up or dissolving the albumens.

It has been found that the bad flavor produced by the hydrolysis of albumens is based on two causes, and this invention has been formulated on this recognition. Firstly, the bad flavor is caused by a subsidiary reaction in the hydrolytic disintegration of the albumens which probably has the character expressed by the following chemical formula:

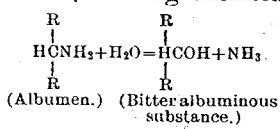

(Albumen.)  (Bitter albuminous substance.)

Ammonia is thus separated by an ammoniacal separation from the albumoses or amino acids, while probably the remainder of the material which is poor in nitrogen represents the bad tasting substance. As a matter of fact the hydrolyzing liquid always has a distinct odor of ammonia when alkalis are employed. Secondly, the bad flavor is caused by a rancid decomposition of the fatty substances and the formation of acids which precipitate lime (such as stearic acid, oleic acid, valeric acid, etc.). Now this invention is based on the further discovery, that by hydrolysis with ammonia under conditions as regards temperature in which steam alone produces no appreciable hydrolysis, flavoring substances of the second group are alone formed, which may then be removed by means of lime, although the hydrolyzing liquid in ammoniacal hydrolysis does not itself appreciably differ as regards the bad flavor from the other alkalis. If therefore the flesh of animals be dissolved or broken up with ammonia, the bad smelling solution treated with lime and handled in the ordinary way, a perfectly tasteless albumen powder is obtained such as cannot be obtained by the processes hitherto employed. This characteristic action of ammonia in contrast to other alkalis is explainable in the following way: The chemical re-action hereinbefore indicated which produced bitter substances, does not in fact produce ammonia according to known chemical principles for the reason that it is itself a product of this re-action. It does not do this more particularly at a temperature of under 107° C. where steam alone still remains without any appreciable hydrolytic action. It is however to be assumed that the ammonia retards this reaction for the same reason on the principle of the action of masses, when it is present in excess from the first. The ammonia therefore acts purely hydrolytically exclusively on the binding of the esters of the amino acids. In hydrolysis by means of ammonia, only flavoring substances which are capable of being precipitated or rather destroyed by means of lime are therefore formed and if by the present process following the ammonia hydrolysis, a subsequent treatment with lime or earth alkali hydroxids is carried out, quite tasteless and inodorous albumen powders are obtained without its being necessary to employ oxidizing substances (such as permanganate and hydrogen superoxid) or reducing substances (such as sulfurous acid), the use of which is always very dangerous in preparing nutritive substances for human use.

The process is carried out as an example in the following way: 400 g. of well cooked and minced flesh of sea fish or animals are treated with one liter of water, and as much ammonia solution as will make the solution a 2% one. The solution is then heated in a closed vessel for from 4 to 8 hours at a temperature of from 102 up to at most 107° C. The hydrolysis must be carried on until the ammoniacal albuminate formed at the first has lost the property of becoming again insoluble when dried, and genuine albumoses preferably exist in solution. After cooling below 45° C. or to the ordinary temperature, 5 g. of calcium hydroxid are added in the form of milk of lime and allowed to act under agitation for about one hour on the solution. Carbonic acid is then introduced, avoiding any excess and if desired after previous filtration, and the solution is then filtered preferably by means of kieselguhr purified with alkali. The filtrate is preferably boiled, while air is blown through it, in order to remove any bicarbonate formed, and again filtered. The filtrate condensed *in vacuo* is dried and pulverized. An inodorous and tasteless albumen powder is thus obtained which is soluble in water and which does not absorb moisture when exposed to the air. It is particularly advantageous to add the lime to the hydrolyzing liquid while warm, and to allow it to cool with it. If this be done however in the presence of an excess of calcium hydroxid or other earth alkali hydroxid, gelatinous lime albuminate precipitates are formed which represent a considerable loss of albumen. This precipitation may be avoided by adding while warm only precisely as much lime as is exactly necessary for removing the flavor and then allowing the solution to cool. A further precaution for preventing these precipitations under heat consists in a small quantity of soda lye being added in addition to the excess of lime, and thereby the solution made more strongly alkaline. The excess of free soda lye is subsequently neutralized with hydrochloric acid.

In treating the flesh of sea fish by this process the unexpected result is obtained that the resultant albumen powder is perfectly free from the unpleasant fishy flavor. The cause of this lies in the peculiarity of the present process that the hydrolizing liquid is condensed *in vacuo* in an alkaline reaction of ammonia. The odorous methyl amino bases are normally chemically combined with the albumen of fish flesh, wherefore fresh fish is quite odorless. These basic albumen compounds exist however only in an insoluble form. If therefore the fish flesh be rendered soluble by means of alkalis, all the combined bases are thereby liberated. In this form and in the presence of other alkalis in excess they are very volatile and disappear from the solution when evaporated, so that the albumen powder produced according to this process gives off no appreciable fishy odor, even in the case of decomposition.

It should be understood that the present process for producing tasteless albumen solution is adapted to be especially employed for producing said solution from the flesh of fish. It should be understood, however, that the same process may be used for producing the material above named from the flesh of other animals without departing from the spirit of the invention.

I declare that what I claim is:—

1. The process of producing an inodorous tasteless albumen solution from flesh consisting in hydrolizing the cooked flesh under heat with ammonia at the temperature at which steam alone develops very little hydrolytic action and bringing the hydrolized liquid produced into contact with lime and allowing the two to remain for a considerable period until the reaction is complete, after which the lime is removed in known manner and the solution filtered and worked up in known manner.

2. The process of producing an inodorous tasteless albumen powder, soluble in water from flesh, characterized by the cooked flesh being hydrolized under heat with ammonia, cooling the solution and adding lime in excess, allowing the requisite reaction, and then removing the lime by known means, filtering the solution, and obtaining the powdered albumen by known means.

3. The process for producing inodorous tasteless albumen from flesh, characterized by the cooked flesh being hydrolized under heat with ammonia at a temperature not exceeding 107 degrees centigrade, adding to the hydrolized solution calcium hydroxid and a small quantity of soda lye while still hot.

4. The improvement in the process of producing inodorous tasteless albumen from flesh by hydrolizing the cooked flesh under heat with ammonia, and water, at a temperature of about from 102 to 107 degrees centigrade, adding calcium hydroxid at a temperature below 45 degrees centigrade, then heating up to 90 or 100 degrees, and adding soda lye and finally neutralizing the soda lye with hydrochloric acid.

In witness whereof, I have hereunto signed my name this 21st day of October 1912, in the presence of two subscribing witnesses.

ROBERT BASS.

Witnesses:
ARTHUR SCHWEINBURG,
ADOLPH FISCHER.

---

Copies of this patent may be obtained for five cents each, by addressing the "Commissioner of Patents, Washington, D. C."